(12) United States Patent
Reynolds et al.

(10) Patent No.: US 11,773,943 B2
(45) Date of Patent: Oct. 3, 2023

(54) BUMP STOP ASSEMBLY

(71) Applicant: Sandcraft LLC, Phoenix, AZ (US)

(72) Inventors: Brent G. Reynolds, Peoria, AZ (US); Jonathan D. Roberts, Peoria, AZ (US)

(73) Assignee: SANDCRAFT, LLC., Phoenix, AZ (US)

( * ) Notice: Subject to any disclaimer, the term of this patent is extended or adjusted under 35 U.S.C. 154(b) by 0 days.

(21) Appl. No.: 17/944,116

(22) Filed: Sep. 13, 2022

(65) Prior Publication Data

US 2023/0003277 A1    Jan. 5, 2023

Related U.S. Application Data

(63) Continuation of application No. 17/394,301, filed on Aug. 4, 2021, now Pat. No. 11,441,638.

(60) Provisional application No. 63/178,503, filed on Apr. 22, 2021, provisional application No. 63/135,405, filed on Jan. 8, 2021.

(51) Int. Cl.
| | |
|---|---|
| *B60G 7/04* | (2006.01) |
| *F16F 15/02* | (2006.01) |
| *F16F 7/00* | (2006.01) |
| *B60G 13/00* | (2006.01) |
| *F16F 9/54* | (2006.01) |

(52) U.S. Cl.
CPC ............... *F16F 15/02* (2013.01); *B60G 7/04* (2013.01); *B60G 13/001* (2013.01); *F16F 7/00* (2013.01); *F16F 9/54* (2013.01); *B60G 2204/45* (2013.01); *F16F 2230/0005* (2013.01); *F16F 2236/12* (2013.01)

(58) Field of Classification Search
CPC . B60G 3/14; B60G 7/04; B60G 13/06; B60G 2204/45; B60G 2204/4502
See application file for complete search history.

(56) References Cited

U.S. PATENT DOCUMENTS

| | | | | |
|---|---|---|---|---|
| 3,547,215 | A * | 12/1970 | Bird ....................... | B60G 9/003 280/86.75 |
| 3,758,091 | A * | 9/1973 | Heinz ..................... | B60G 11/60 267/292 |
| 5,599,038 | A * | 2/1997 | German ................. | B60G 11/113 280/124.175 |
| 6,390,485 | B1 * | 5/2002 | Cadden .................. | B60G 11/44 280/124.1 |

(Continued)

*Primary Examiner* — Frank B Vanaman
(74) *Attorney, Agent, or Firm* — BOOTH UDALL FULLER, PLC; Pacer K. Udall (57) ABSTRACT

A bump stop assembly for a UTV with a frame attachment, a shock absorber attachment, two panels, a shock absorber and a bracket. The frame attachment is coupled to the frame of the UTV and the shock absorber attachment is coupled to the shock absorber. The two panels extend between the frame attachment and the shock attachment. The bracket is coupled to the trailing arm of the suspension system of the UTV. The bump plate bracket has a bump plate located to contact the shock absorber when a force applied to the suspension system causes the suspension system to reach a predetermined level of a capacity of the suspension system to absorb. The bump plate transfers a portion of the force applied to the shock absorber. The shock absorber is configured to absorb energy transferred to the bump stop assembly by the force applied to the suspension system.

11 Claims, 11 Drawing Sheets

(56) References Cited

U.S. PATENT DOCUMENTS

| | | | | |
|---|---|---|---|---|
| 6,969,090 B1 * | 11/2005 | Works | ................... | B60D 1/488 |
| | | | | 280/901 |
| 8,998,260 B2 * | 4/2015 | Kausch | ................. | B62D 21/11 |
| | | | | 280/124.109 |
| 10,183,698 B2 * | 1/2019 | Ta | ......................... | B62D 21/12 |
| 2013/0068550 A1 * | 3/2013 | Gale | ....................... | B62D 9/02 |
| | | | | 280/5.509 |
| 2016/0031277 A1 * | 2/2016 | Verbowski | ........... | B60G 13/005 |
| | | | | 29/401.1 |
| 2019/0263208 A1 * | 8/2019 | Smith | ..................... | B60G 7/04 |
| 2021/0155068 A1 * | 5/2021 | Stabel | ................... | B60G 11/02 |

* cited by examiner

BUMP STOP ASSEMBLY

CROSS REFERENCE TO RELATED APPLICATIONS

This application is a continuation application of U.S. patent application Ser. No. 17/394,301 entitled "BUMP STOP ASSEMBLY" to Reynolds et al., that was filed on Aug. 4, 2021, now U.S. Pat. No. 11,441,638, issued on Sep. 13, 2022, which application claims the benefit of the filing date of both U.S. Provisional Patent Application No. 63/135,405 entitled "BUMP STOP ASSEMBLY" to Reynolds et al. that was filed on Jan. 8, 2021, as well as of U.S. Provisional Patent Application 63/178,503 entitled "BUMP STOP ASSEMBLY FOR A UTILITY TERRAIN VEHICLE (UTV)" to Reynolds et. al. that was filed on Apr. 22, 2021, the disclosures of which are hereby incorporated herein by this reference.

TECHNICAL FIELD

Aspects of this document relate generally to bump stop assemblies, and more specifically to bump stop assemblies made for utility terrain vehicles ("UTV").

BACKGROUND

Recreational and off-highway vehicles (UTVs) are designed to be able to travel over bumps and cracks in terrain without bottoming out. This is typically done by including a suspension between the wheels and the vehicle body. When such vehicles travel over bumps and cracks, the suspension absorbs the vertical movement of the wheels so that the vehicle body generally stays at the same height, or moves up and down much more slowly. This helps to avoid damage to the vehicle, as well as harm to the driver and passengers. However, it is still possible for the suspension to bottom out when traveling at higher speeds or over rougher terrain. When this occurs, damage is done to the vehicle frame and the suspension components. Other parts of the vehicle may collide as well, causing additional damage. In addition, the vehicle passengers can experience serious bodily harm, such as spinal compression.

SUMMARY

Aspects of this document relate to a bump stop assembly for a UTV comprising a frame attachment configured to couple with a frame of the UTV, the frame attachment having an upper clamp and a lower clamp each configured to grip the frame of the UTV, the upper clamp separated from the lower clamp by a saddle configured to support the frame within the frame attachment, a shock absorber attachment having at least one clamp, at least one panel extending between the frame attachment and the shock absorber attachment, the at least one panel having a bend extending diagonally across the at least one panel and dividing the at least one panel into a first section and a second section, a shock absorber gripped by the at least one clamp of the shock absorber attachment, the shock absorber having a piston configured to absorb and dissipate energy transferred to the bump stop assembly by a force applied to a suspension system of the UTV, and a bump stop bracket coupled to a trailing arm of the suspension system, the bracket having a bump plate located to contact the shock absorber when the force applied to the suspension system causes the suspension system to reach a predetermined level of a capacity of the suspension system to absorb, the bump plate bracket configured to transfer a portion of the force applied to the suspension system to the shock absorber.

Particular embodiments may comprise one or more of the following features. The at least one panel may comprise at least one attachment tab on each of the first section and the second section, each of the attachment tabs configured to mate with a slot on one of the frame attachment and the shock absorber attachment. The frame attachment may be coupled to a frame or a roll cage of the UTV. The frame attachment may be welded to the frame. The bracket may be welded to the trailing arm. The frame attachment may be coupled to the frame through at least one mechanical fastener. The frame attachment may be coupled to a front portion of the frame to provide shock absorption for a front wheel of the UTV. The frame attachment may be coupled to a rear portion of the frame to provide shock absorption for a rear wheel of the UTV.

Aspects of this document relate to a bump stop assembly for a UTV comprising a frame attachment configured to couple with a frame of the UTV, a bump stop shock absorber configured to couple with the frame attachment, and a bump plate located to contact the bump stop shock absorber when a force applied to a suspension system of the UTV causes the suspension system to reach a predetermined level of a capacity of the suspension system, the bump plate configured to transfer a portion of the force applied to the suspension system to the bump stop shock absorber.

Particular embodiments may comprise one or more of the following features. The frame attachment may have at least one clamp configured to grip the frame of the UTV. The bump stop assembly may further comprise a panel disposed between, and coupled to, the frame attachment and the shock absorber, the panel having a first section and a second section. The panel may further comprise at least one attachment tab on each of the first section and the second section, each of the attachment tabs configured to mate with the frame attachment and the shock absorber attachment, respectively, wherein the shock absorber attachment is coupled to the bump stock shock absorber. The first section and the second section may be separated by a bend extending across the panel. The shock absorber may comprise a piston configured to absorb energy transferred to the bump stop assembly by the force applied to the suspension system. The shock absorber may be configured to dissipate energy transferred to the bump stop assembly by the force applied to the suspension system. The frame attachment may be coupled to the frame through a weld. The frame attachment may be coupled to the frame through at least one mechanical fastener. The frame attachment may be coupled to a front portion of the frame to provide shock absorption for a front wheel of the UTV. The frame attachment may be coupled to a rear portion of the frame to provide shock absorption for a rear wheel of the UTV. The bump plate may be coupled to a bump plate bracket and the bump plate bracket is coupled to an arm of the suspension system.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a bump stop assembly 100 designed to provide additional protection against bottoming out for an off-road vehicle, such as a UTV. When the off-road vehicle travels over a bump or crack, the force applied to the off-road vehicle is mostly absorbed by the suspension system of the off-road vehicle. In situations where the capability of the suspension system to absorb the force is exhausted to a predetermined level, the bump stop assembly 100 may be configured to engage. The bump stop assembly 100 is configurable, such that any predetermined level may be selected. For example, in one embodiment, the bump stop assembly 100 may engage once the suspension system has exhausted 75% of its ability to absorb the force applied. Another embodiment may be configured to engage at 25 or 50%. As stated above, any percentage may be selected.

Figure 6:
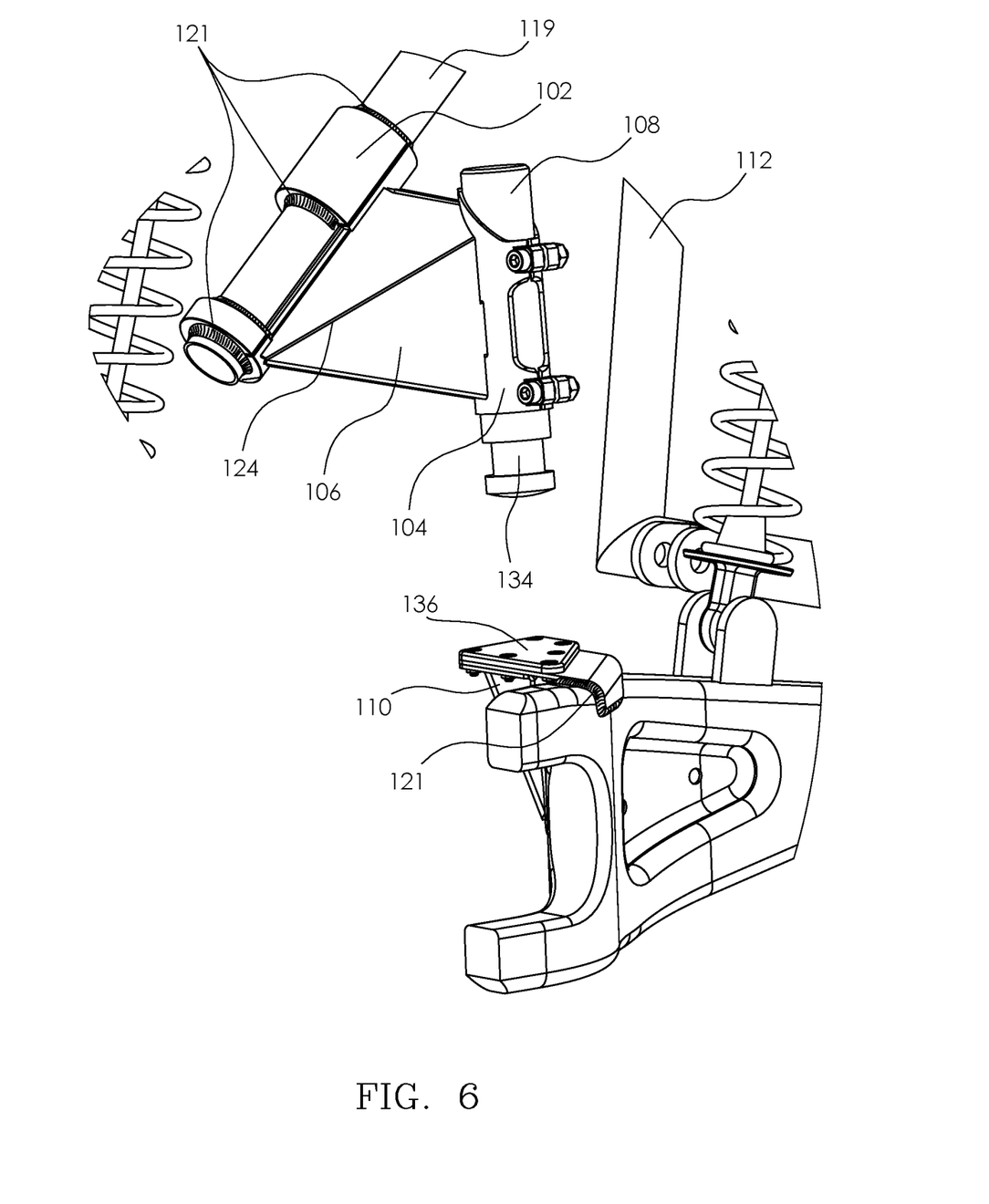
FIG. 6 is a perspective view of another embodiment of the bump stop assembly welded to the frame of the off-road vehicle.
Figure 9A:
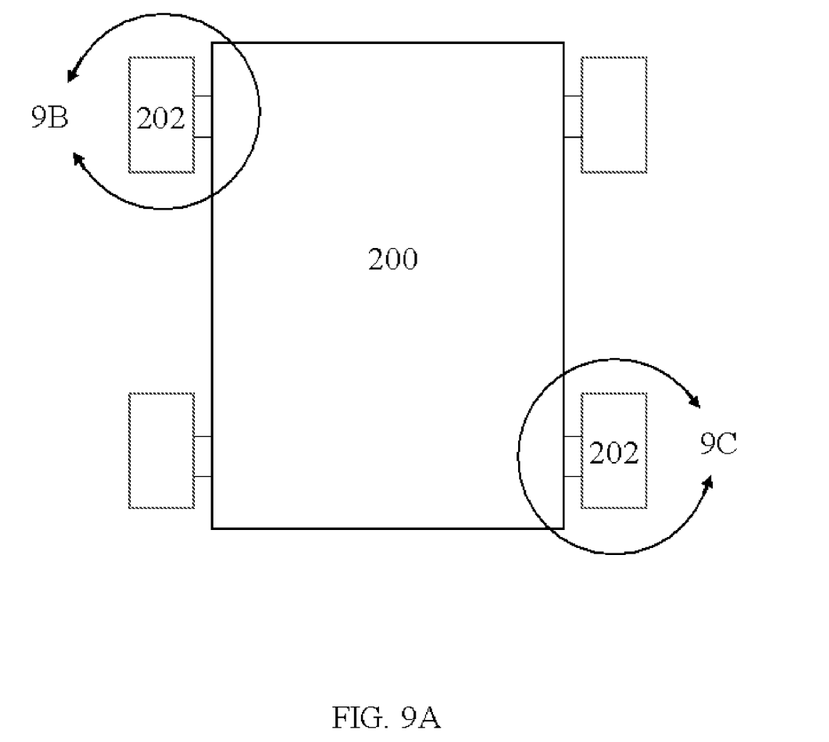
FIG. 9A is a top schematic view of a UTV with the bump assembly shown in FIG. 1 installed an both front and both rear wheels.
Figure 9B:
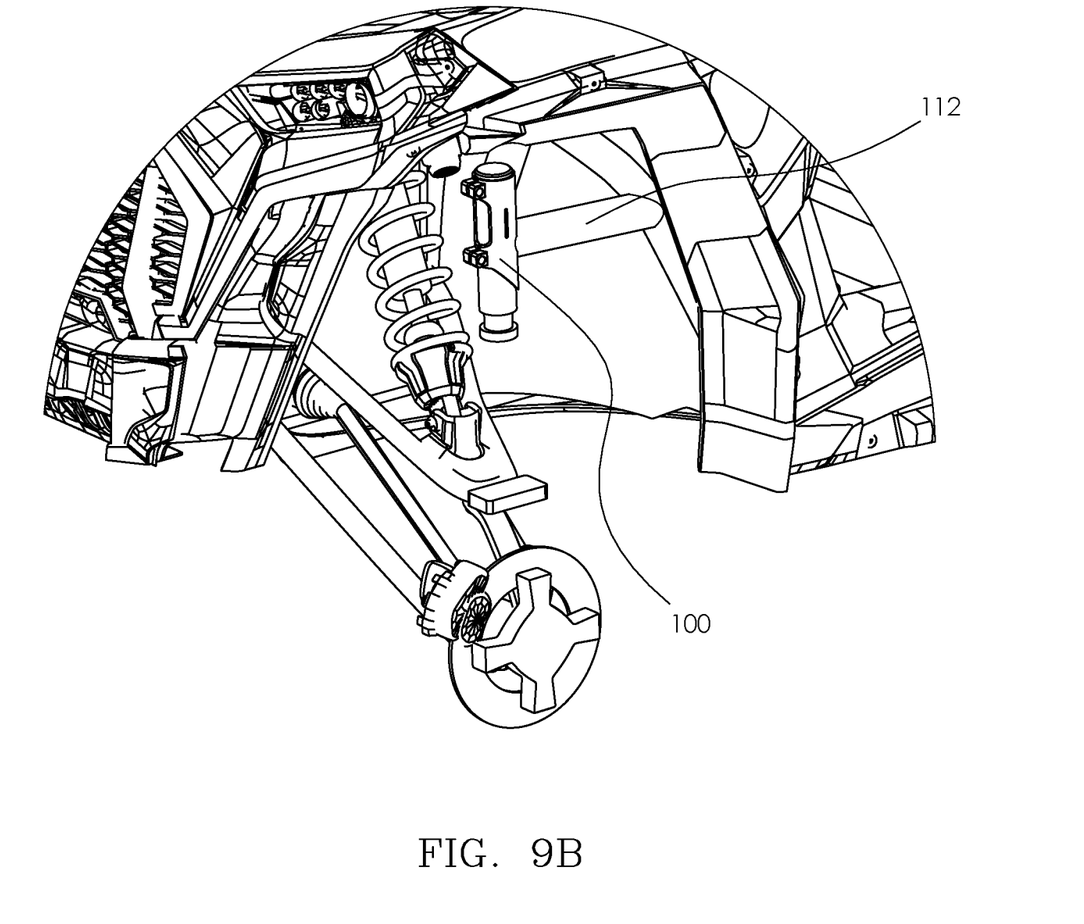
FIG. 9B is a close-up view of the front wheel of the UTV shown in FIG. 9A, taken from the circular section line 9B.
Figure 9C:
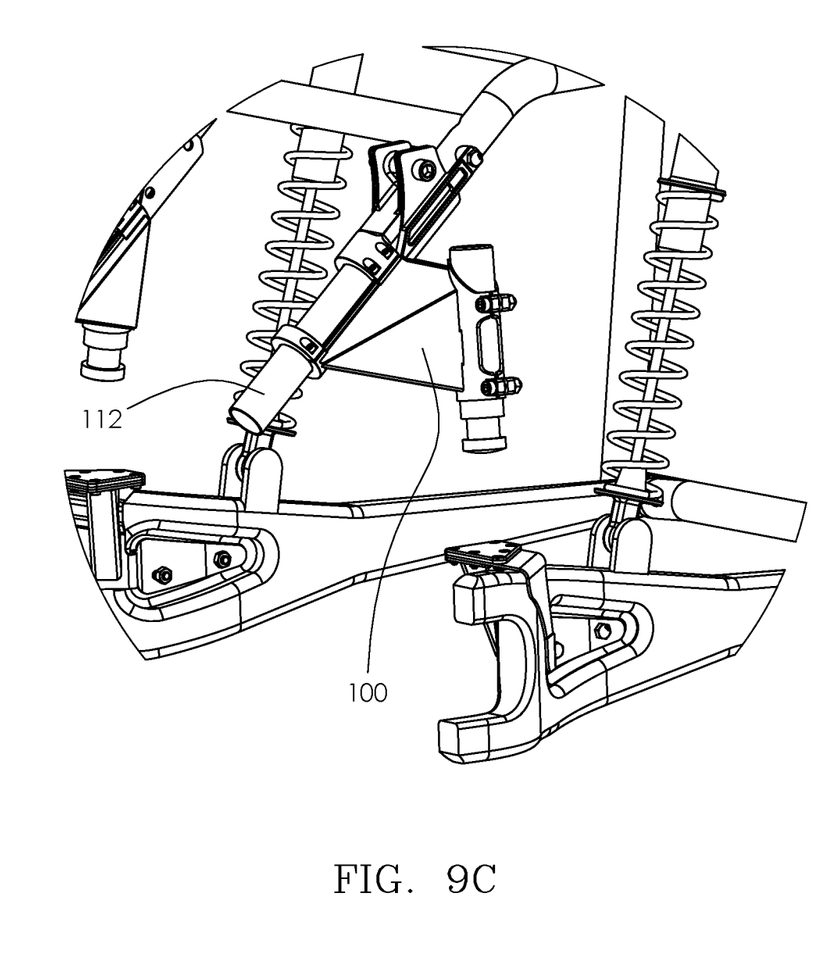
FIG. 9C is a close-up view of the back wheel of the UTV shown in FIG. 9A, taken from circular section line 9C.

FIGS. 1-5 illustrate one embodiment of the bump stop assembly 100 of the UTV 200. The bump stop assembly 100 has a frame attachment 102 and a shock absorber attachment 104. Additionally, the bump stop assembly 100 may have at least one panel 106, a shock absorber 108, and a bracket or bump plate bracket 110. In some instances, the shock absorber 108 may be a bump stop, such as a bump stop (or hydraulic bump stop) made by King Shocks, Fox, or another supplier as known in the art. The bump stop assembly 100 may be implemented on each wheel of the off-road vehicle, including the front and rear wheels, as illustrated in FIGS. 9A-9C. The frame attachment 102 is configured to couple to a frame 112 of an off-road vehicle. The frame attachment 102 may couple to a roll cage or frame member of the off-road vehicle or UTV 200 as well. The frame attachment 102 may have at least one clamp 114, which may include an upper clamp 116 and a lower clamp 118. In some embodiments, the at least one clamp 114 is configured to wrap around and grip a member 119 of the frame 112 of the off-road vehicle 200 (see FIG. 5). As shown in FIGS. 1-5, the at least one clamp 114 may include at least one mechanical fastener 120, such as a screw, which tightens the at least one clamp 114 around the frame 112. In other embodiments, the at least one clamp 114 is another type of mount or assembly configured to join the frame attachment 102 to the frame 112. Alternatively, or in addition, the frame attachment 102 may couple to the frame 112 through a weld 121, as shown in FIG. 6. Other methods of attaching the bump stop assembly 100 to the frame 112 may be used. The upper clamp 116 may be separated from the lower clamp 118 by a saddle 122. The saddle 122 is configured to support the frame 112 within the frame attachment 102. As shown, the saddle 122 may be an open pipe which joins the upper clamp 116 to the lower clamp 118.

In embodiments with the at least one panel 106, the at least one panel 106 extends between the frame attachment 102 and the shock absorber attachment 104. In some embodiments, the at least one panel 106 is two panels 106, but may be any desirable number of members or subcomponents that are joined, as well as a single or integrally formed member. The at least one panel 106 may or may not be a flat sheet, may take any shape, and may be formed of shaped, bent, or formed sheet material, channel material, extruded members, cast members, billet members, forged members, or be machined from a block or larger component or source of material. In some instances, panel 106 may be absent and frame attachment 102 may be in direct contact with, or directly attached to, the shock absorber attachment 104, without any intervening members or elements, such as panel 106. The purpose of the at least one panel 106 is to join the frame attachment 102 to the shock absorber attachment 104. In some embodiments, the frame attachment 102 is directly coupled to the shock absorber attachment 104, and the at least one panel 106 is not needed. Each of the at least one panel 106 may have a bend 124 which extends across the panel 106 and divides the panel 106 into a first section 126 and a second section 128. The bend 124 may extend diagonally across the panel 106. The bend 124 allows for a flat or planar member to accommodate positions or multiple members to which it is coupled, and that otherwise would not be aligned. Each of the panels 106 may have at least one attachment tab 130 on each of the first section 126 and the second section 128. Each of the at least one attachment tab 130 is configured to mate with a slot 132 on one of the frame attachment 102 and the shock absorber attachment 104.

The shock absorber attachment 104 is configured to couple to the shock absorber 108. Similar to the frame attachment 102, the shock absorber attachment 104 may have at least one clamp 114 which is configured to grip the shock absorber 108. The shock absorber attachment 104 may also couple to the shock absorber 108 through a weld. Other methods of attaching the shock absorber attachment 104 to the shock absorber 108 may be used. The shock absorber 108 is configured to absorb energy transferred to the bump stop assembly 100 by the force applied to the suspension system. In addition, some embodiments dissipate this energy transferred to the bump stop assembly 100. For example, the shock absorber 108 may be configured so that when a force is applied to the suspension system that exceeds the predetermined level of the capacity of the suspension system to absorb on its own, the bump stop assembly 100 engages and absorbs a portion of the force applied through the shock absorber 108. In some embodiments, this force is transferred to the bump stop assembly 100 specifically through a piston 134 of the shock absorber 108. The piston 134 may be one or more of a shaft, a spring, a dashpot, an elastically deformable material, and a rubber mount. The piston 134 may be a charged piston or a hydraulic piston. In embodiments with a charged piston, the piston 134 is pneumatic and thus compresses a charged fluid to absorb a portion of the energy transferred to the bump stop assembly 100. Some of this energy is also dissipated through heat as the charged fluid is compressed. The charged fluid may be any suitable fluid, including nitrogen or air. In other embodiments, the charged piston may be electric, magnetic (whether electromagnet, rare earth magnet, or other magnet), or any other suitable type known in the art.

The bracket or bump plate bracket 110 may be coupled to a trailing arm of the suspension system. In some embodiments, the bracket 110 is welded to the trailing arm, while in other embodiments, the bracket 110 is coupled to the trailing arm with at least one fastener or clamp. Other methods of coupling components together may also be used. To aid in the transfer of force from the suspension system to the bump stop assembly 100, the bump plate bracket 110 comprises or has a bump plate 136. The bump plate 136 is located to contact the shock absorber 108 when the force applied to the suspension system causes the suspension system to reach the predetermined level of the capacity of the suspension system to absorb. In addition, the bump plate 136 may be oriented horizontal to the surface supporting the vehicle. Because the bump plate 136 and the shock absorber 108 are not fixed to each other either translationally or rotationally, but instead only contact each other, the bump plate 136 mainly transfers only certain directions of the force to the shock absorber 108. For example, the bump plate 136 may be configured to transfer a vertical component of the force applied to the suspension system to the shock absorber 108 without transferring a horizontal component of the force.

The bump stop assembly is used on the UTV 200, which for the purposes of this disclosure, includes, but is not limited to: a(n) all-terrain vehicle ("ATV"), off-highway vehicle ("OHV"), off-road vehicle ("ORV"), utility task vehicle, recreational off-highway vehicle ("ROV"), side-by-side UTV or ROV, quad, quad bike, four-wheeler, snowmobile, dune buggy, or the like. In certain implementations, the bump stop assembly is used in a vehicle that may experience high stresses or be driven with less care than normal, such as: golf carts, farm or ranch vehicles, construction vehicles, rental cars, commercial vehicles, go-carts, racing vehicles, mid- or light-duty snowplows, or other vehicles that encounter rugged terrain and/or abusive driving habits. In some implementations, the bump stop assembly is used on UTVs such as a side-by-side UTV or ROV vehicle such as: a Polaris® RZR®, a Polaris® Ranger®, a Kawasaki® Mule™, Arctic Cat® Wildcat™, Arctic Cat® Prowler®, Can-Am® Maverick®, Can-Am® Maverick® X3, Yamaha® YXZ1000R®, Yamaha® Wolverine®, or other similar ROV or UTV vehicles currently existing or yet to be developed.

Figure 7:
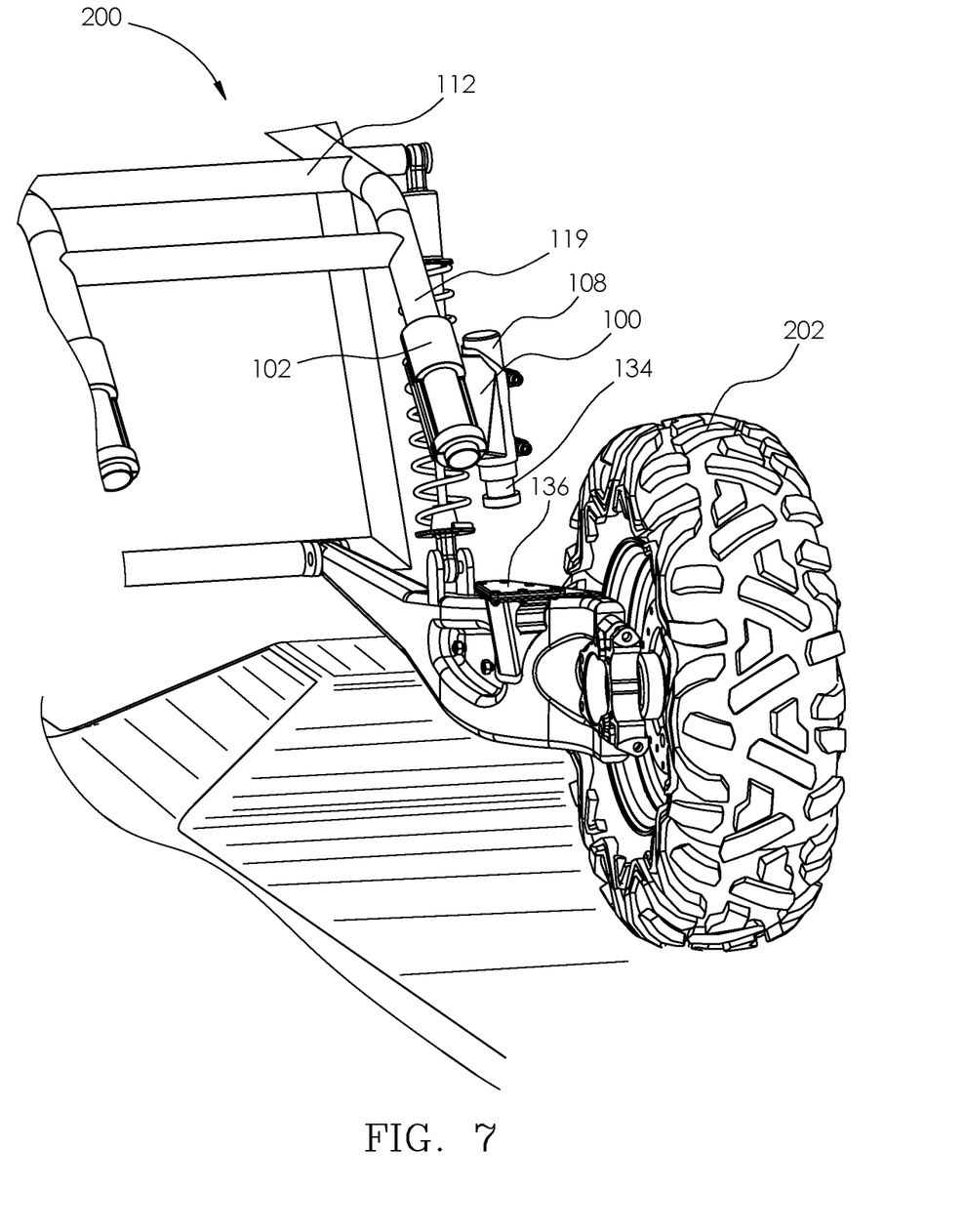
FIG. 7 is a close-up view of the bump stop assembly shown in FIG. 1 coupled to the off-road vehicle prior to the occurrence of an upward force.
Figure 8:
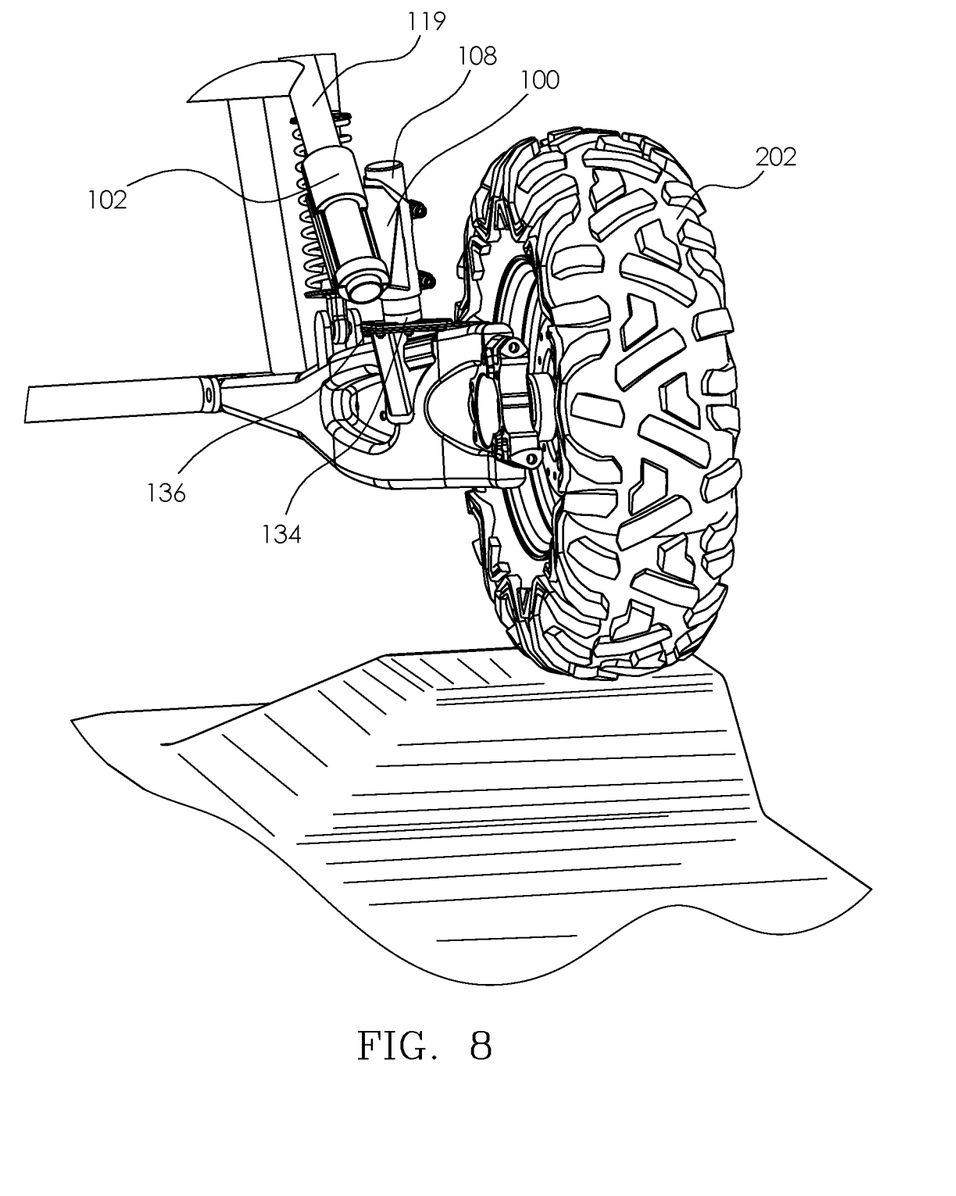
FIG. 8 is a close-up view of the bump stop assembly shown in FIG. 1 coupled to the off-road vehicle during the occurrence of an upward force.

The at least one panel 106 couples the frame attachment 102 to the shock absorber attachment 104, such that the shock absorber attachment 104 securely holds the shock absorber 108. As shown in FIGS. 7-8, when a force is applied to the wheels of the vehicle 200, the wheels 202 move upward, which compresses the suspension of the vehicle. If the force exceeds the predetermined level of the capacity of the suspension system to absorb on its own, the bump stop assembly 100 engages and passes the excess force to the shock absorber 108, causing the piston 134 to compress into the shock absorber 108. This absorbs a portion of the force applied and stretches the duration of the transfer of the force from the wheels to the frame 112 over a longer period of time. This decreases the stresses that occur in the frame 112 and other vehicle components, as well as protects passengers of the vehicle from excessive forces.

Figure 1:
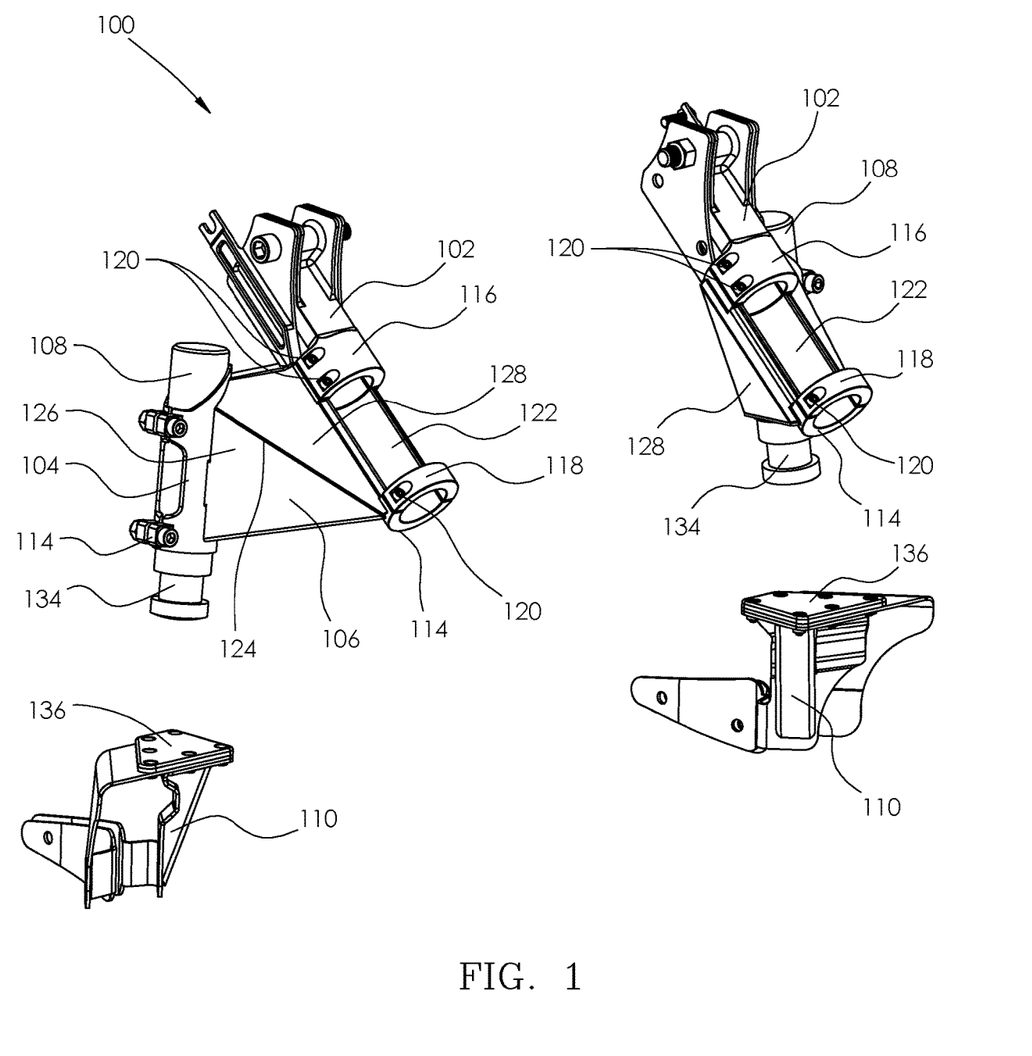
FIG. 1 is a front perspective view of a bump stop assembly.
Figure 2:
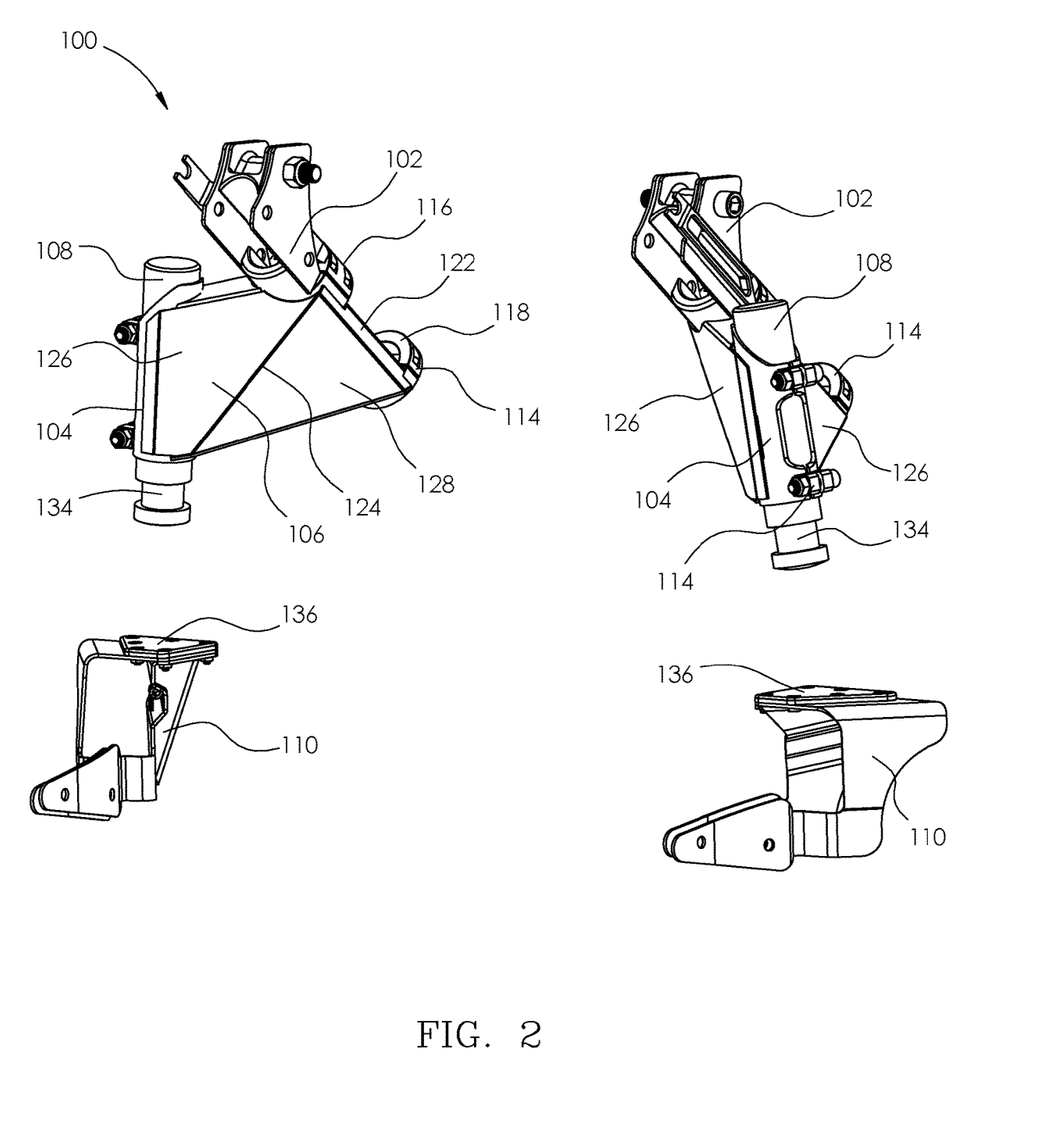
FIG. 2 is a back perspective view of the bump stop assembly shown in FIG. 1.
Figure 3:
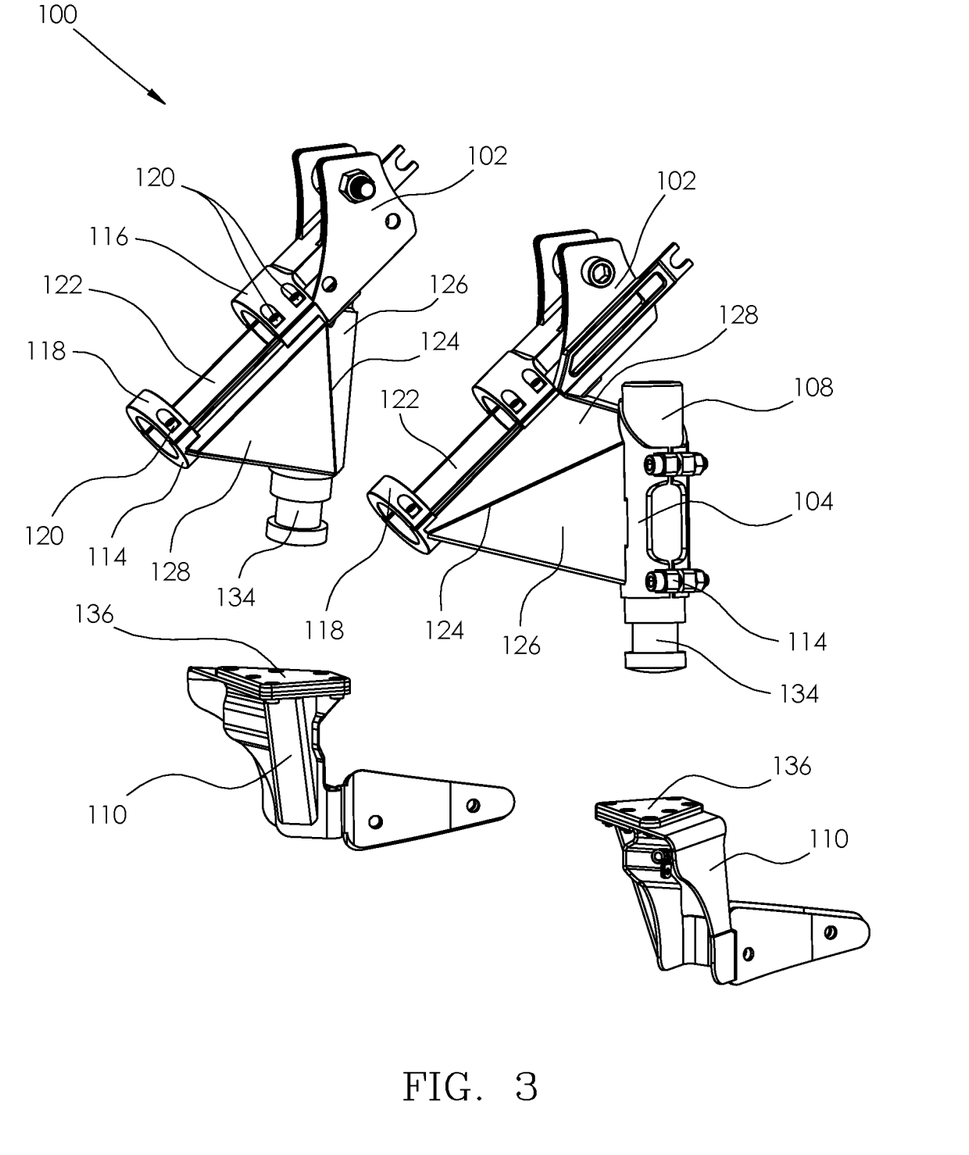
FIG. 3 is a side perspective view of the bump stop assembly shown in FIG. 1.
Figure 4:
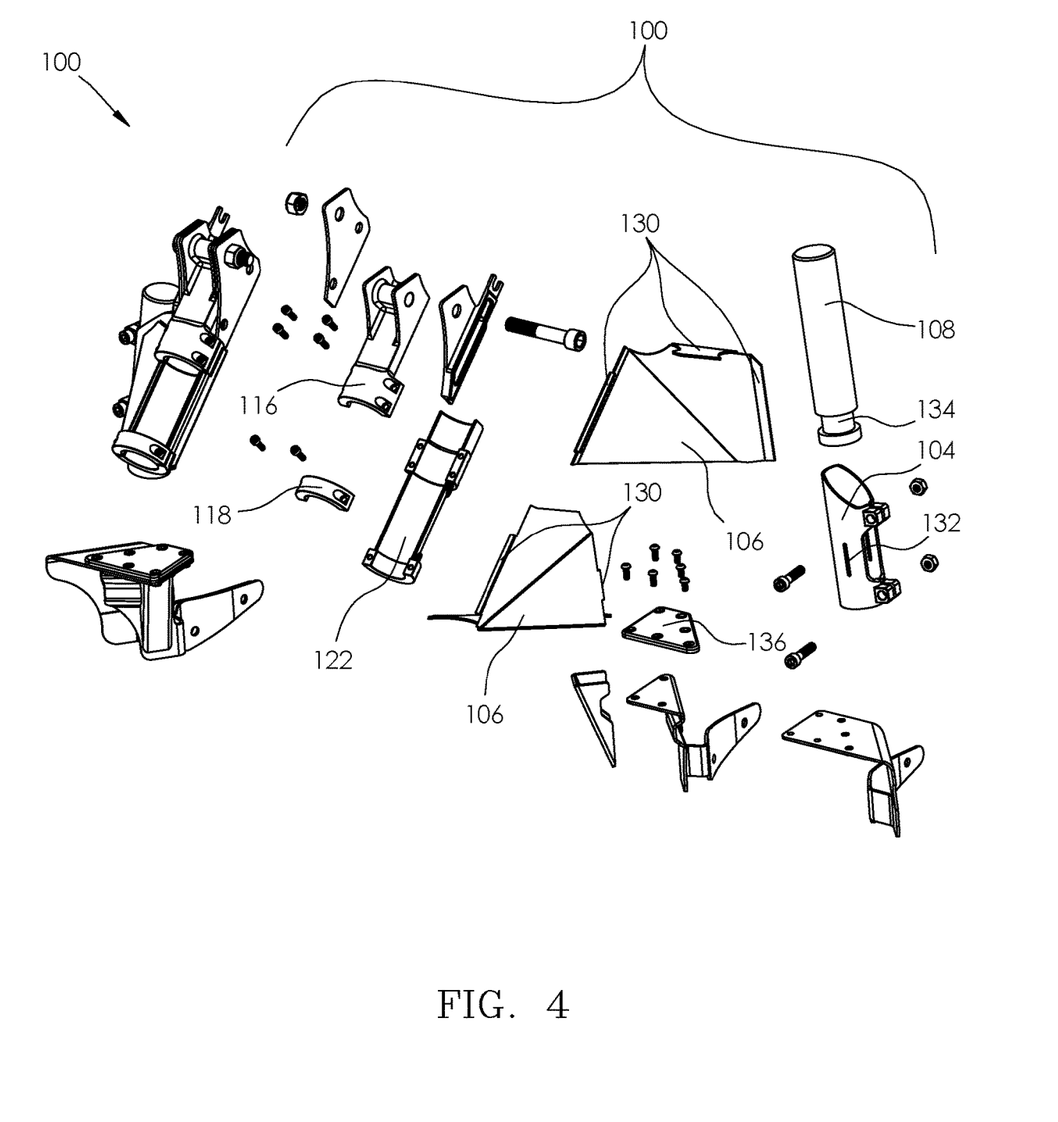
FIG. 4 is an exploded view of the bump stop assembly shown in FIG. 1.
Figure 5:
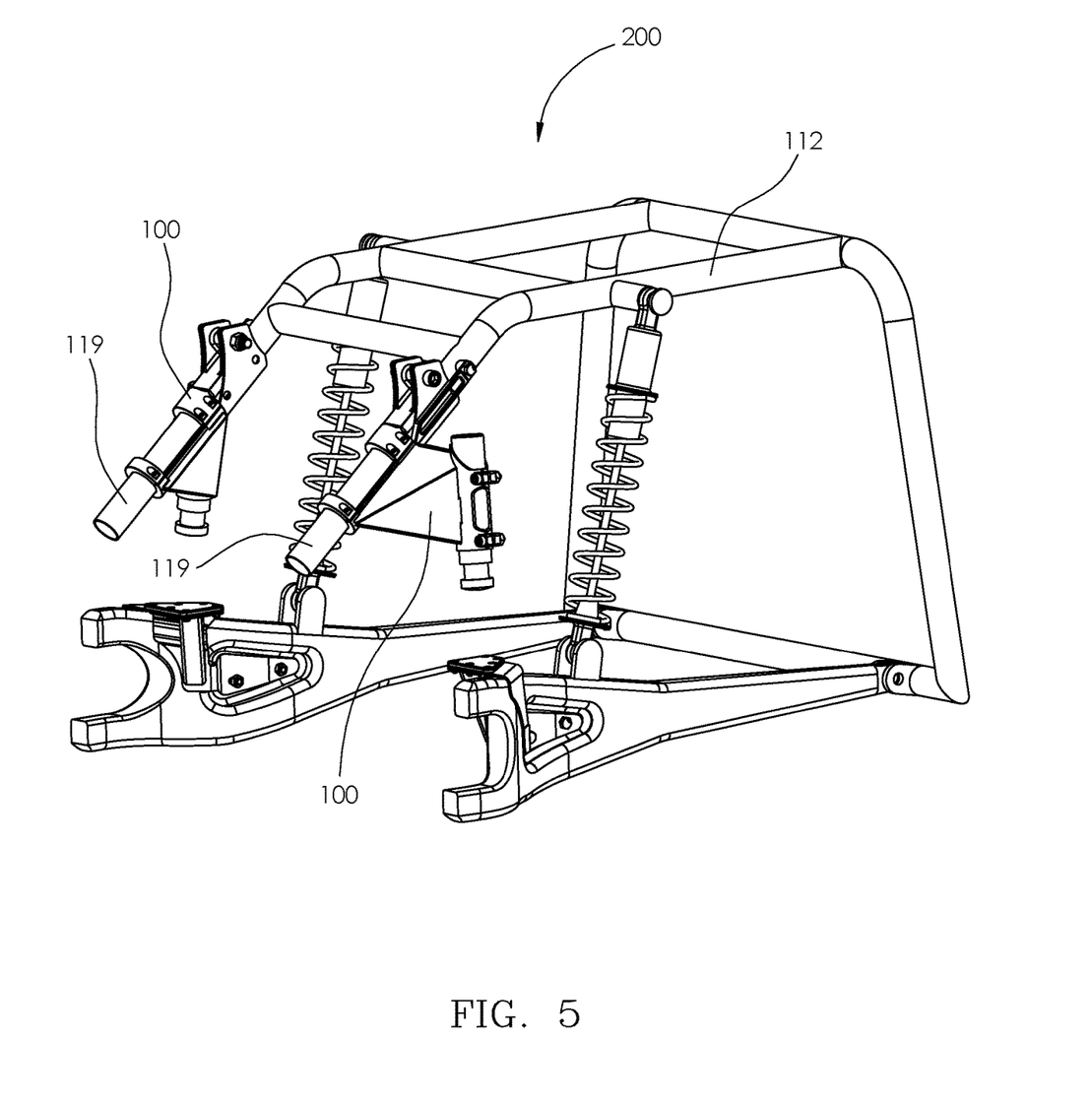
FIG. 5 is a perspective view of the bump stop assembly shown in FIG. 1 coupled to an off-road vehicle.

FIG. 9A is a top schematic view of the UTV 200 with the bump assembly shown in FIG. 1 installed on both front wheels 202 and both rear wheels 202. FIG. 9B is a close-up view of the front wheel 202 of the UTV 200 shown in FIG. 9A, taken from circular section line 9B. FIG. 9C is a close-up view of the back wheel 202 of the UTV 200 shown in FIG. 9A, taken from circular section line 9C.

It will be understood that implementations of a bump stop assembly are not limited to the specific assemblies, devices and components disclosed in this document, as virtually any assemblies, devices and components consistent with the intended operation of a bump stop assembly may be used. Accordingly, for example, although particular bump stop assemblies, and other assemblies, devices and components are disclosed, such may include any shape, size, style, type, model, version, class, measurement, concentration, material, weight, quantity, and/or the like consistent with the intended operation of bump stop assemblies. Implementations are not limited to uses of any specific assemblies, devices and components; provided that the assemblies, devices and components selected are consistent with the intended operation of a bump stop assembly.

Accordingly, the components defining any bump stop assembly may be formed of any of many different types of materials or combinations thereof that can readily be formed into shaped objects provided that the materials selected are consistent with the intended operation of a bump stop assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various bump stop assemblies may be manufactured using conventional procedures as added to and improved upon through the procedures described here. Some components defining a bump stop assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling bump stop assemblies are not limited to the specific order of steps as disclosed in this document. Any steps or sequence of steps of the assembly of a bump stop assembly indicated herein are given as examples of possible steps or sequence of steps and not as limitations, since various assembly processes and sequences of steps may be used to assemble bump stop assemblies.

The implementations of a bump stop assembly described are by way of example or explanation and not by way of limitation. Rather, any description relating to the foregoing is for the exemplary purposes of this disclosure, and implementations may also be used with similar results for a variety of other applications employing a bump stop assembly.

What is claimed is:

1. A bump stop assembly for a UTV, comprising:
a frame attachment configured to couple with a frame of the UTV;
a shock absorber attachment configured to couple with a shock absorber;
a panel disposed between, and coupled to, the frame attachment and the shock absorber attachment, the panel having a plurality of attachment tabs, wherein each of the attachment tabs is configured to insert into one of the frame attachment and the shock absorber attachment; and
a bump plate located to contact the shock absorber when a force applied to a suspension system of the UTV causes the suspension system to reach a predetermined level of a capacity of the suspension system, the bump plate configured to transfer a portion of the force applied to the suspension system to the shock absorber.

2. The bump stop assembly of claim 1, the frame attachment having at least one clamp configured to grip the frame of the UTV.

3. The bump stop assembly of claim 1, wherein the frame attachment is coupled to the frame through a weld.

4. The bump stop assembly of claim 1, the panel having a first section and a second section separated by a bend extending diagonally across the panel, wherein the bend is configured to align the first section with the frame attachment and align the second section with the shock absorber attachment.

5. The bump stop assembly of claim 1, wherein the frame attachment is coupled to a front portion of the frame to provide shock absorption for a front wheel of the UTV.

6. The bump stop assembly of claim 1, wherein the frame attachment is coupled to a rear portion of the frame to provide shock absorption for a rear wheel of the UTV.

7. A bump stop assembly for a UTV, comprising:
a frame attachment configured to couple with a frame of the UTV;
a shock absorber attachment configured to couple with a shock absorber;
a panel disposed between, and coupled to, the frame attachment and the shock absorber attachment, the panel having a bend extending diagonally across the panel and dividing the panel into a first section and a second section, wherein each of the first section and the second section has at least one attachment tab configured to mate with one of the frame attachment and the shock absorber attachment; and
a bump plate located to contact the shock absorber when a force applied to a suspension system of the UTV causes the suspension system to reach a predetermined level of a capacity of the suspension system, the bump plate configured to transfer a portion of the force applied to the suspension system to the shock absorber.

8. The bump stop assembly of claim 7, the frame attachment having at least one clamp configured to grip the frame of the UTV.

9. The bump stop assembly of claim 7, wherein the frame attachment is coupled to the frame through a weld.

10. The bump stop assembly of claim 7, wherein the frame attachment is coupled to a front portion of the frame to provide shock absorption for a front wheel of the UTV.

11. The bump stop assembly of claim 7, wherein the frame attachment is coupled to a rear portion of the frame to provide shock absorption for a rear wheel of the UTV.

* * * * *